United States Patent [19]

Caron et al.

[11] Patent Number: 4,666,240

[45] Date of Patent: May 19, 1987

[54] SPLICE ORGANIZER FOR OPTICAL CABLE SPLICES

[75] Inventors: Bernard G. Caron; John C. Hoffer, both of Harrisburg; Martin R. Rupert, Hummelstown, all of Pa.

[73] Assignee: AMP Incorporated, Harrisburg, Pa.

[21] Appl. No.: 697,311

[22] Filed: Feb. 1, 1985

[51] Int. Cl.[4] .................................................. G02B 6/44
[52] U.S. Cl. ............................... 350/96.20; 350/96.22; 350/96.23; 174/93
[58] Field of Search ............... 350/96.20, 96.21, 96.22, 350/96.23; 174/92, 93

[56] References Cited

U.S. PATENT DOCUMENTS

| 4,236,047 | 11/1980 | Haeder | 174/77 R |
|---|---|---|---|
| 4,237,335 | 12/1980 | Giebel et al. | 174/92 |
| 4,266,853 | 5/1981 | Hutchins et al. | 350/96.20 |
| 4,319,951 | 3/1982 | Korbelak et al. | 350/96.22 |
| 4,332,435 | 6/1982 | Post | 350/96.20 |
| 4,359,262 | 11/1982 | Dolan | 350/96.20 |
| 4,373,776 | 2/1983 | Purdy | 350/96.20 |
| 4,418,982 | 12/1983 | Williams | 350/96.20 |
| 4,428,645 | 1/1984 | Korbelak et al. | 350/96.20 |
| 4,500,166 | 2/1985 | Kunze | 350/96.20 |
| 4,502,754 | 3/1985 | Kawa | 350/96.20 |
| 4,518,817 | 5/1985 | Kirby et al. | 350/96.20 |

FOREIGN PATENT DOCUMENTS

| 61367 | 9/1982 | European Pat. Off. | 350/96.20 |
|---|---|---|---|
| 3033928 | 3/1982 | Fed. Rep. of Germany | 350/96.20 |
| 154212 | 9/1982 | Japan | 350/96.20 |

Primary Examiner—William L. Sikes
Assistant Examiner—Frank González
Attorney, Agent, or Firm—Gerald K. Kita

[57] ABSTRACT

A splice organizer (56) for optical cable splices (30, 32, 42) within a splice closure assembly (1) having end walls (2, 4), supporting bars (6, 8) joining the end walls (2, 4) and bridging between the end walls (2, 4), a splice closure space (12) between the end walls (2, 4), optical cables (14, 16) entering the end walls (2, 4), corresponding optical conductors (22, 24) of the optical cables (14, 16) projecting into the splice closure space (12), optical connector bodies (30, 32) terminated to corresponding optical conductors (22, 24), and optical splices (30, 32, 42) formed by pairs of the optical connector bodies (30, 32) in axial alignment to transmit optical signals between corresponding optical conductors (24, 28) terminated to the optical connector bodies (30, 32) in axial alignment, a series of receptacles (56) for the corresponding pairs of optical conductors (22, 24), each of the receptacles (56) comprising side walls (58, 60) and a central dividing wall (62) defining first and second compartments (84, 88) for containing lengths of the optical conductors (22, 24) connected to corresponding optical splices (30, 32, 42) mounted on the receptacle (56), and mounting brackets (96) on the receptacle (56) for mounting the receptacle (56) to the supporting bars (6, 8), with the sidewalls (58, 60) of the receptacle (56) substantially parallel to the end walls (2, 4) of the splice closure assembly (1).

8 Claims, 8 Drawing Figures

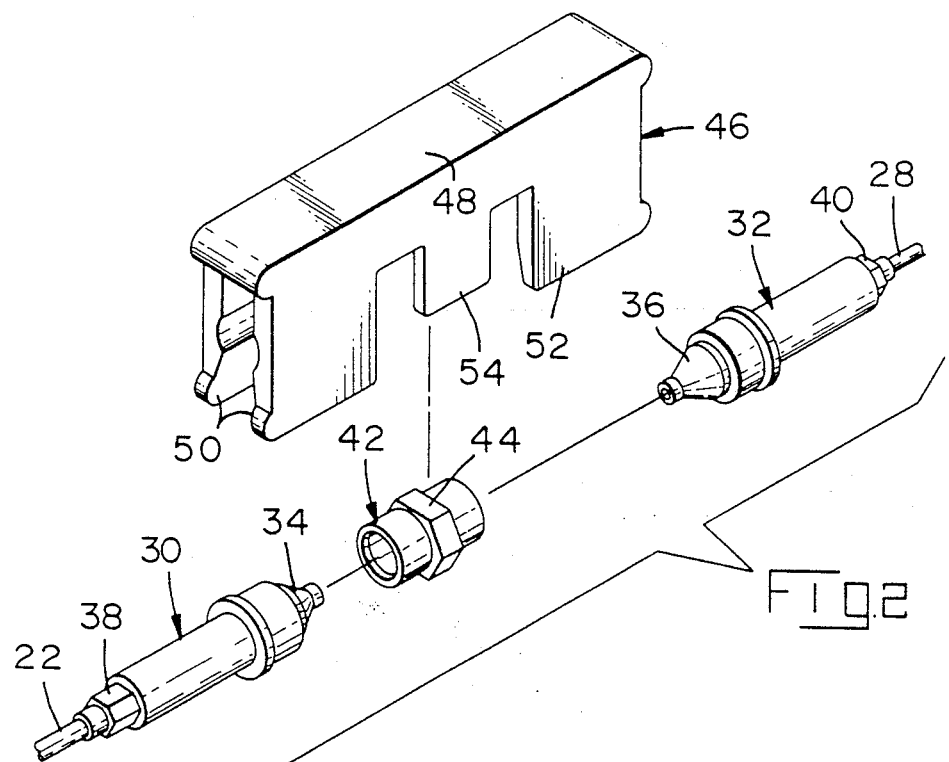
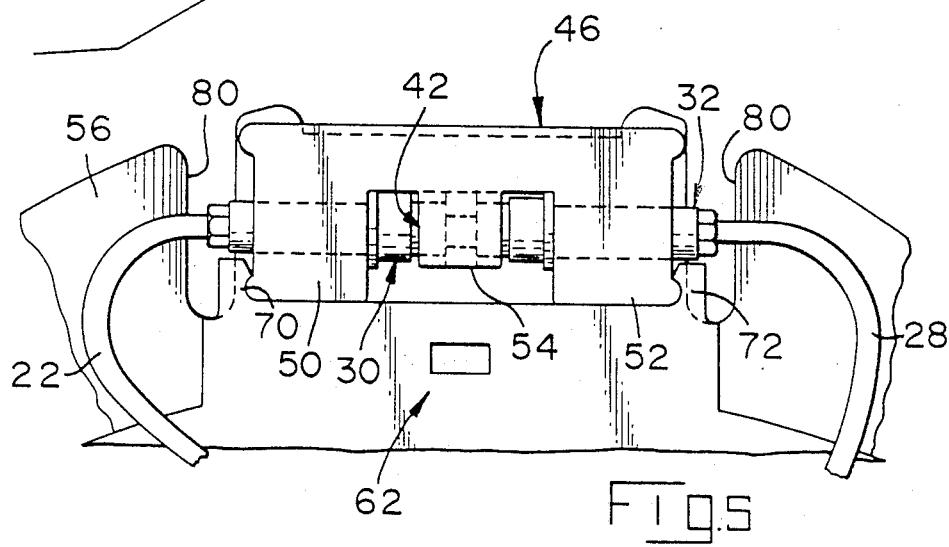

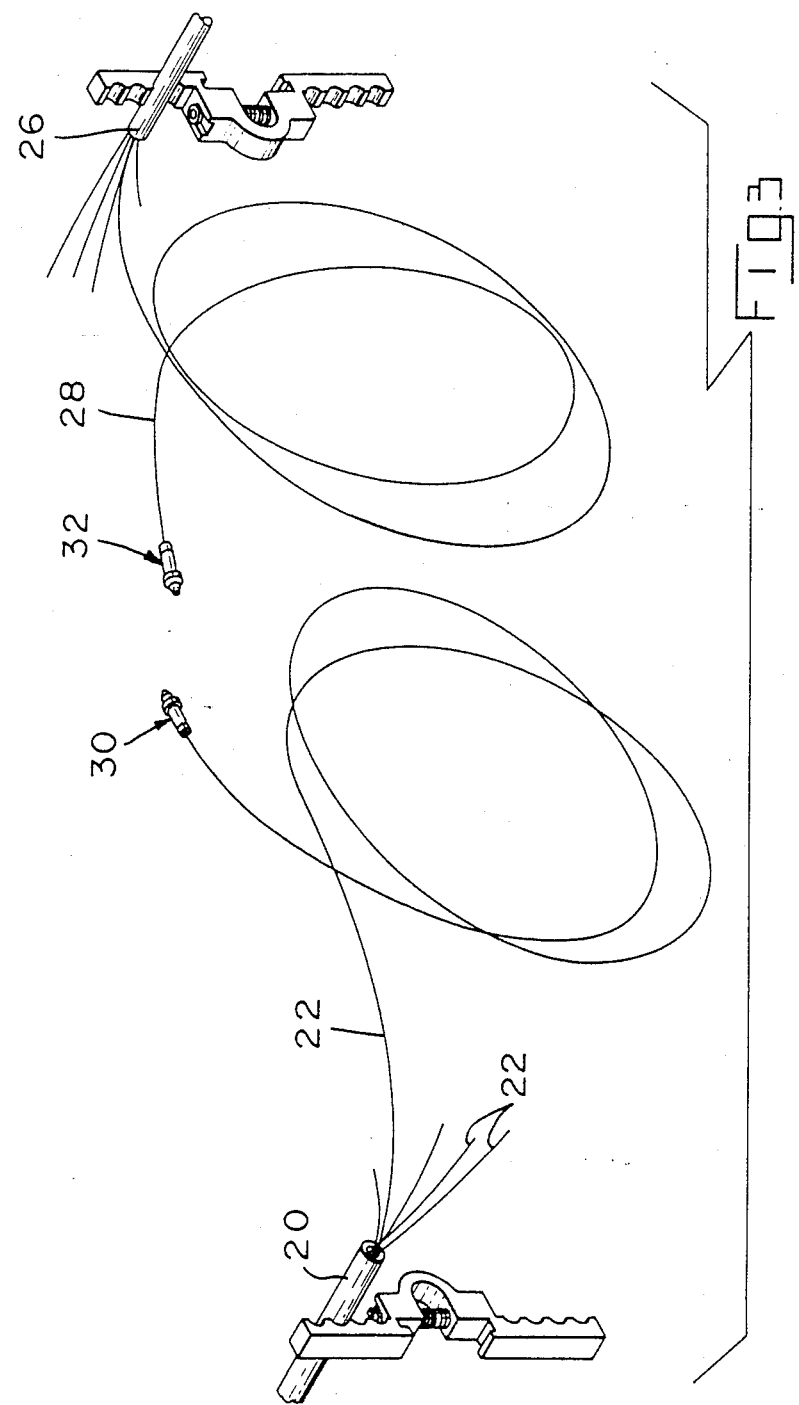

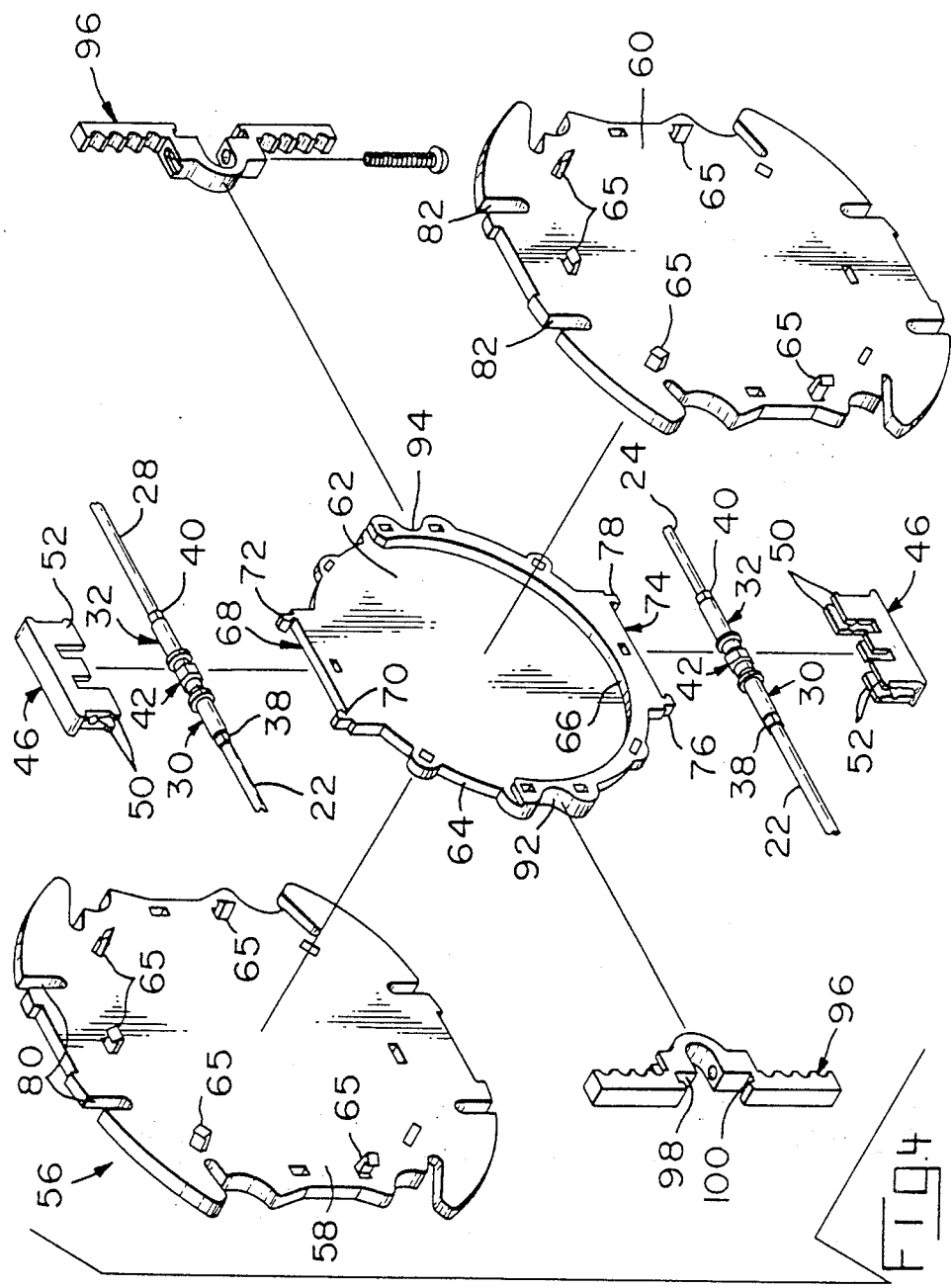

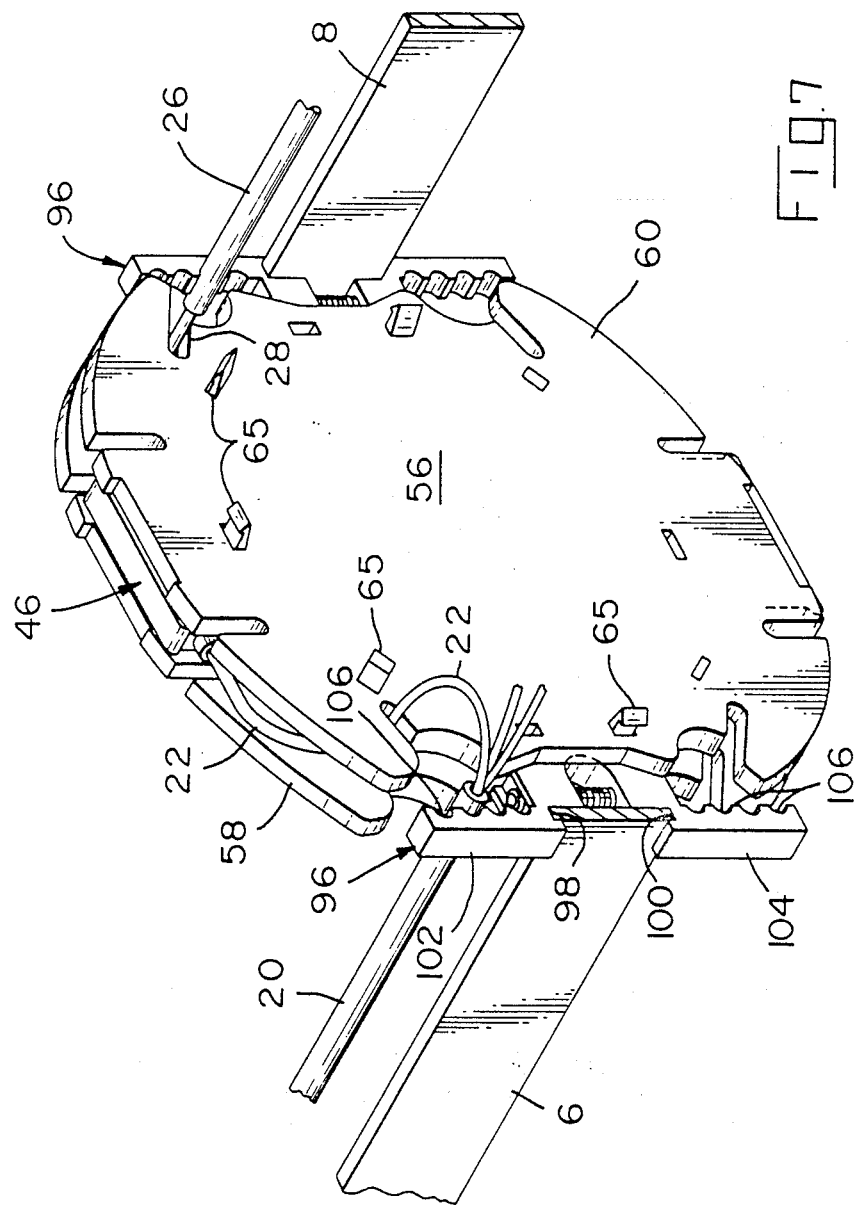

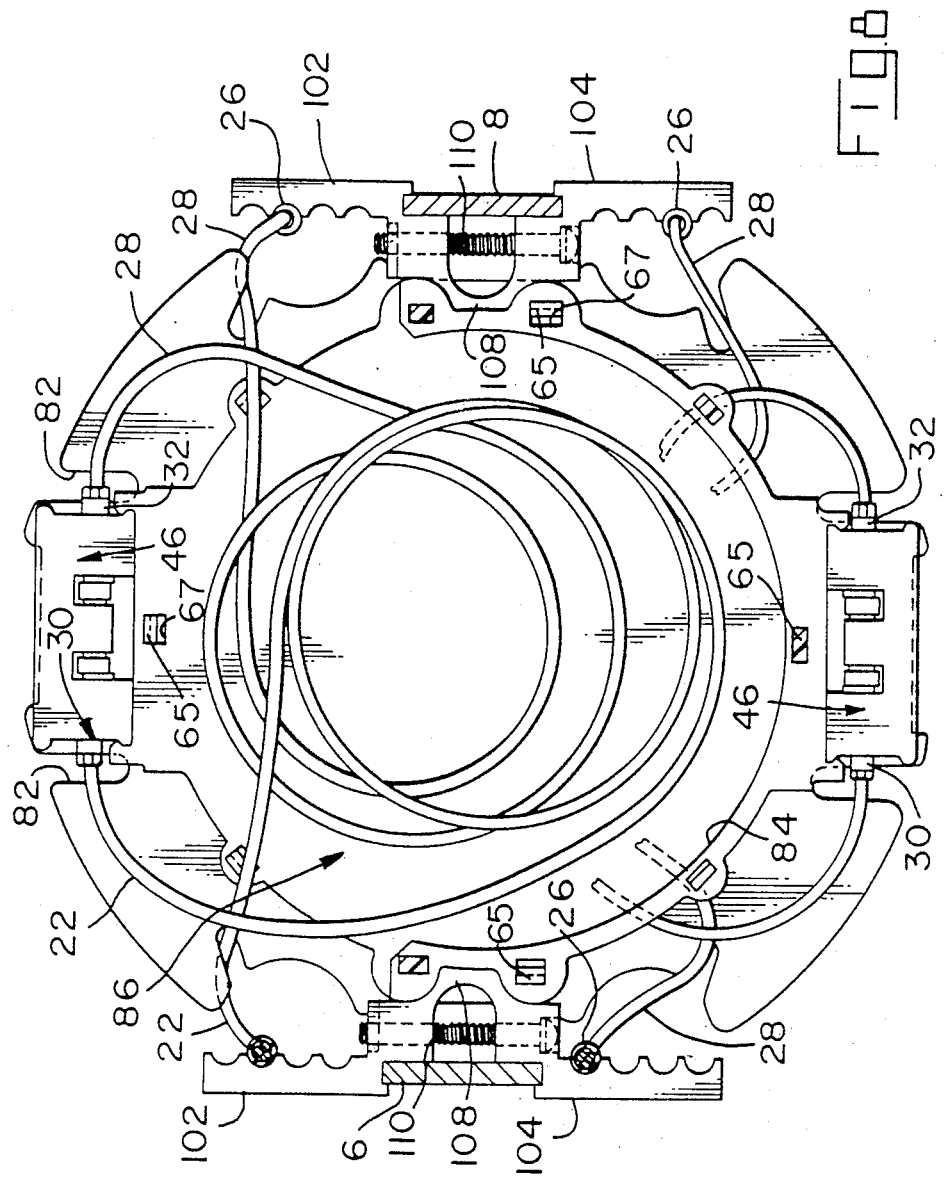

SPLICE ORGANIZER FOR OPTICAL CABLE SPLICES

FIELD OF THE INVENTION

This invention relates to the field of splice closure assemblies, and especially to a splice organizer for optical cable splices within a splice closure assembly.

BACKGROUND OF THE INVENTION

A splice closure assembly is in the form of a protective case that clamps onto communications cable containing either electrical or optical conductors, and forms a sealed enclosure for splices of the conductors. Further the splice closure assembly is characterized by end walls, supporting bars joining and bridging between the end walls, a splice closure space between the end walls, optical cables projecting through the end walls and into the splice closure space, optical connector bodies terminated to corresponding optical conductors, and optical splices formed by pairs of the optical connector bodies in axial alignment within corresponding sleeve housings to transmit optical signals between corresponding optical conductors terminated to the optical connector bodies. Further details of a splice closure assembly may be found in the disclosure of each of U. S. Pat. Nos. 4,103,911; 4,002,818; 4,087,190; 4,236,047 and 4,237,335.

The optical conductors of an optical communications cable are manufactured with diameters in the range of 100 microns diameter to 500 microns diameter. A micron is 0.00004 inch. These conductors are susceptible to breakage and are readily snagged in crevices or on sharp protuberances. Accordingly, there is a need for a splice closure assembly which protects the optical conductors from snagging and breakage. Further there is a need to prevent tangling of the optical conductors within a splice closure assembly, since tangling increases the likelihood of damage to the conductors.

SUMMARY OF THE INVENTION

The invention resides in a splice organizer for optical cable splices within a splice closure assembly. The organizer is in the form of a receptacle for containing the optical conductors, and optical connector bodies terminated to corresponding optical conductors, and optical splices formed by pairs of the optical connector bodies in axial alignment to transmit optical signals between corresponding pairs of optical conductors terminated to the optical connector bodies. The receptacle allows access to and removal of the splices at a later date and is formed with flat side walls on either side of a dividing wall. A first compartment between the dividing wall and a side wall is for containing lengths of optical conductors extending from the optical cables and connected to a first optical splice mounted on a first splice mounting means at an entrance of the first compartment. A second compartment between the dividing wall and another side wall is for containing lengths of optical conductors extending from the optical cables and connected to a second optical splice mounted on a second splice mounting means at an entrance of the second compartment. A receptacle mounting means of the splice organizer mounts the receptacle to the supporting bars of a splice closure assembly, with the side walls of the receptacle substantially parallel to the end walls of the splice closure assembly. Multiple receptacles are readily combined by stacking within the splice closure assembly.

An object of the invention is to provide a splice organizer which contains and protects optical conductors of an optical cable from tangling, breakage and snagging within a splice closure assembly and allows access to and removal of the conductors and the splices at a later date.

Another object of the invention is to provide a splice organizer for optical cable splices within a splice closure assembly having, end walls, supporting bars joining the end walls and bridging between the end walls, a splice closure space between the end walls, optical cables entering the end walls, corresponding optical conductors of the optical cables projecting into the splice closure space, optical connector bodies terminated to corresponding optical conductors, and optical splices within the splice closure space formed by pairs of the optical connector bodies in axial alignment to transmit optical signals between corresponding optical conductors terminated to the optical connector bodies.

Another object of the invention is to provide multiple splice organizers stacked together within a splice closure assembly, wherein each splice organizer comprises side walls and compartments between the side wall for containing and protecting lengths of optical conductors and connector bodies terminated to the conductors and optical splices formed by corresponding pairs of the connector bodies in axial alignment within corresponding sleeve housings.

DESCRIPTION OF THE DRAWINGS

FIG. 2 is a fragmentary perspective illustration, with portions of the illustration separated, of a pair of optical conductors of the optical cables shown in FIG. 1, and optical connector bodies terminated to the optical conductors, and a sleeve housing for an optical splice formed by the optical connector bodies in axial alignment within the sleeve housing, and a holder for the sleeve housing and the connector bodies;

FIG. 3 is a schematic view of the optical conductors and the connector bodies of FIG. 2, together with mounting brackets for holding the optical conductors which extend from the optical cables that extend into the splice closure assembly of FIG. 1;

FIG. 4 is a fragmentary perspective illustration, with parts of the illustration separated, of the component parts of a splice organizer, together with the connector bodies and the sleeve housing and the holder of FIG. 2, and together with the mounting brackets of FIG. 3;

FIG. 5 is a fragmentary elevation view of a portion of the organizer of FIG. 4, and illustrating a splice mounting means;

FIG. 7 is a fragmentary perspective of the organizer of FIG. 4 with parts assembled and mounted to supporting bars of the splice closure assembly of FIG. 1; and FIG. 8 is a side elevation in section of the organizer shown in FIG. 7.

DESCRIPTION OF PREFERRED EMBODIMENTS

Figure 1:
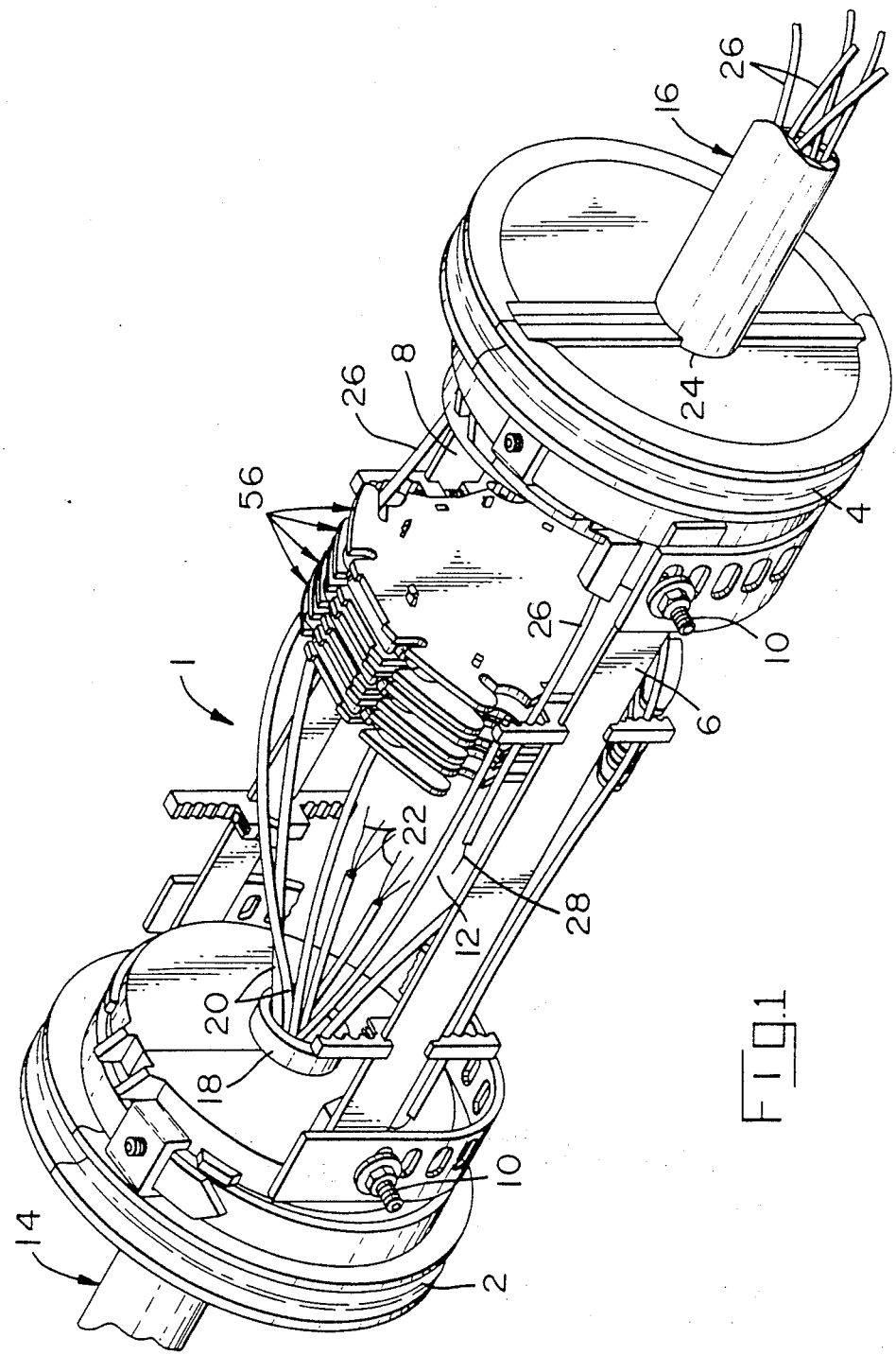
FIG. 1 of the drawings is a perspective view of a splice closure assembly with an outer cover removed to illustrate multiple splice organizers for optical cable splices within the splice closure assembly.

With reference to FIG. 1, there is shown a splice closure assembly 1 in the form of a receptacle having cylindrical end walls 2 and 4. At least two metal supporting bars 6 and 8 bridge between the end walls 2 and 4 and are secured by fasteners, some of which are shown at 10. A splice closure space 12 is defined between the end walls 2 and 4. A pair of optical communications cables 14 and 16 extend through the end walls 2 and 4 and into the space 12. The cable 14 has an outer jacket 18 containing a series of smaller cable jackets 20. Each jacket 20 contains one or more optical conductors 22 which are manufactured with diameters in the range of 100 microns diameter to 500 microns diameter. The cable 16 is similar to cable 14 and has an outer jacket 24, several inner jackets 26 and optical conductors 28.

As shown in FIGS. 1, 2 and 3, the conductors 22 and 28 are terminated to corresponding connector bodies 30 and 32 generally of tubular form and having frustoconical mating ends 34 and 36 and rotatable ends 38 and 40 of hexagonal cross section. The mating ends 34 and 36 may be inserted in corresponding open ends of a sleeve housing 42 having a hexagonal cross section that provides flat surfaces 44. The sleeve housing 42 axially aligns the mating ends 34 and 36 to align also the ends of the corresponding conductors 22 and 28 that are terminated to the connector bodies 30 and 32. The aligned conductors 22 and 28 thereby are spliced or are said to form an optical splice, which means that optical signals can be transferred from one of the aligned conductors 22 or 28 to the other aligned conductor 22 or 28. The ends 38 and 40 of the connector bodies 30 and 32 are joined to corresponding conductors 22 and 28 and are rotatable for rotating the corresponding conductors within the connector bodies 30 and 32, thereby to adjust the axis of the individual conductors 22 and 28 along a common axis of alignment within the sleeve housing 42. It is to be understood that additional conductors 22 are terminated to corresponding connector bodies 30, additional conductors 28 are terminated to corresponding connector bodies 32, and additional splices are formed by the connector bodies 30 in alignment with corresponding connector bodies 32 within corresponding sleeve housings 42. A splice holder 46 is moulded of plastics material, and is in the form of a channel having a closed side 48. A first pair of opposed resilient gripping fingers 50 project from the closed side 48 and are formed with profiles to receive and grip therebetween a connector body 30. A second pair of opposed resilient gripping fingers 52 project from the closed side 48 and are formed with profiles to receive and grip therebetween a connector body 32. A third pair of opposed resilient gripping fingers 54 project from the closed side 48 and are between the first pair of fingers 50 and the second pair of fingers 52. The fingers 54 are formed with profiles to receive and grip therebetween a sleeve housing 42 along its flat surfaces 44. An open side of the channel is defined between the opposed fingers 50, the opposed fingers 52 and the opposed fingers 54. It is understood that a similar splice holder 46 is provided for each optical splice formed by an aligned pair of corresponding connector bodies 30 and 32 in axial alignment within a corresponding sleeve housing 42.

Figure 6:
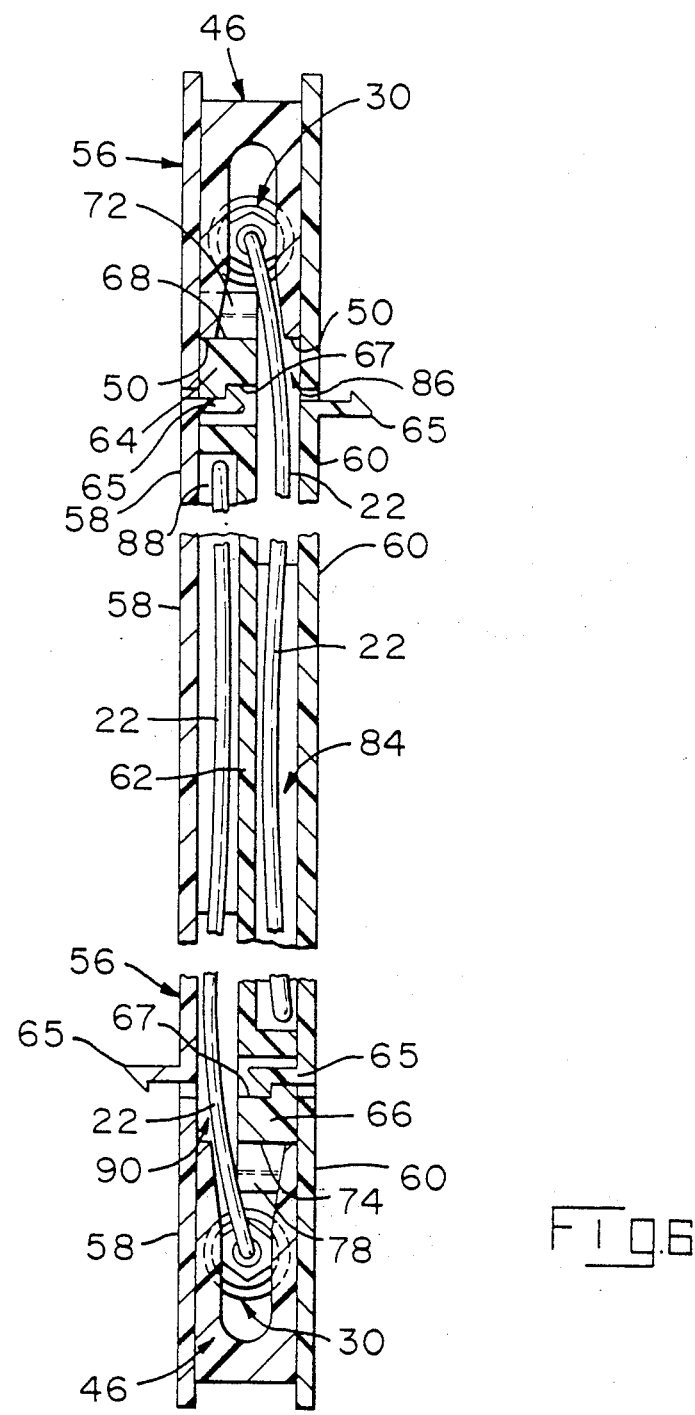
FIG. 6 is an elevation view in section of the portion of the organizer of FIG. 5.

As shown in FIGS. 4, 5 and 6, an organizer for the splice closure assembly is shown at 56. A pair of identical flat side walls 58 and 60 of the organizer 56 are made from transparent plastics material and are assembled with a central dividing wall 62. The dividing wall 62 has a raised flange portion 64 projecting from one side of the dividing wall, and an identical raised flange portion 66 projecting from another side of the dividing wall 62. Each coresponding flange portion 64 and 66 extends along one-half of the circumference of the dividing wall 62. The side walls 58 and 60 have moulded hook latches 65 that hook onto corresponding shoulder portions of latch receiving openings 67 in the flanges 64 and 66. Additional hook latches 65 project from the side walls 58 and 60 to latch into additional flanges 64 and 66, thereby to stack additional dividing walls 62 against the side walls 58 and 60. A first splice mounting means 68 on the flange portion 64 is comprised of an opposed pair of resilient fingers 70 and 72 of hook form for resiliently latching on, respectively, one of the fingers 50 and one of the fingers 52 of a corresponding splice holder 46 mounted on the splice mounting means 68. A second splice mounting means 74 on the flange portion 66 is comprised of an opposed pair of resilient fingers 76 and 78 of hook form for resiliently latching on, respectively, one of the fingers 52 and one of the fingers 50 of a corresponding splice holder 46 mounted on the splice mounting means 74. The side walls 58 and 60 are secured to the corresponding flange portions 64 and 66, for example, by glue. The side walls 58 and 60 extend beside, and thereby contain, the corresponding splice holders 46 mounted on the corresponding splice mounting means 68 and 74. Recesses 80 and 82 in the corresponding side walls 58 and 60 are aligned with the corresponding hexagonal portions 38 and 40 to admit a suitable tool, not shown, for adjusting the rotational position of the hexagonal portions 38 and 40. A first compartment 84 is defined between the dividing wall 62 and the side wall 60. An entrance 86 of the first compartment 84 is opposite the flange 66 and between the side walls 58 and 60. The splice mounting means 68 is within the entrance 86. Lengths of optical conductors 22 and 28, which extend from corresponding cable jackets 20 and 26 and extend to the optical splice mounted on the splice mounting means 68, may be received through the entrance 86 and formed into coils within the first compartment. Similarly, a second compartment 88 is defined between the dividing wall 62 and the side wall 58. An entrance 90 of the second compartment 88 is opposite the flange 64 and between the side walls 58 and 60. The splice mounting means 74 is within the entrance 90. Lengths of optical conductors 22 and 28, which extend from corresponding cable jackets 20 and 26 and extend to the optical splice mounted on the splice mounting means 74, may be received through the entrance 90 and formed into coils within the compartment 88. The compartments thereby contain and protect the conductors 22 and 28 from tangling, snagging or breakage.

The flanges 64 and 66, where they join each other, are provided with arcuate recesses 92 and 94 which are opposite the supporting bars 6 and 8 of the splice closure assembly 1. A receptacle mounting bracket 96 is moulded from plastics material and has a pair of opposed jaws 98 and 100. The jaws 98 and 100 have corresponding cantilever arms 102 and 104, each of which is provided with a series of recesses 106 which frictionally grip a corresponding cable jacket 20 or 26. The jaws are connected by a convex curved web 108. An adjusting means 110 in the form of a nut and threaded bolt passes through the jaws 98 and 100. Each supporting bar 6 and 8 is gripped between jaws 98 and 100 of corresponding mounting brackets 96. The convex curved webs 108 of the mounting brackets 96 project toward the periphery of a corresponding receptacle and into corresponding recesses 92 or 94. The nut and bolt are progressively tightened to adjust the web position progressively toward the periphery of the corresponding receptacle, thereby to grip the receptacle between opposed receptacle mounting brackets 96 and to mount the receptacle with the side walls 58 and 60 parallel to the end walls 2 and 4 of the splice closure assembly 1.

A worker mounts the splice closure assembly 1 to the end portions of the cables 14 and 16, as shown in FIG. 1, and trims the cable jacket to expose lengths of the smaller jackets 20 and 26 that protrude from the cables 14 and 16 within the splice closure space. The smaller jackets 20 and 26 are placed by the worker in corresponding recesses 106 of the arms 102 and 104 while the conductors 22 and 28 protruding from the jackets are terminated to corresponding connector bodies 30 and 32. Pairs of corresponding connector bodies 30 and 32 are aligned within corresponding sleeve housings 42 and frictionally assembled in corresponding splice holders 46. The splice holders 46 are then mounted on corresponding splice mounting means 68 or 74 of selected receptacles 56. The lengths of conductors 22 and 28 extending from the jackets are coiled and placed in the compartments 84 or 88 associated with the selected receptacles 56.

Although a preferred form of the splice organizer is disclosed, other modifications are intended to be covered by the spirit and scope of the claims, for example, multiple splice organizers may be stacked together and supported against each other, and the number of receptacle mounting brackets 96 need not correspond with the number of multiple organizers.

We claim:

1. In a splice organizer for optical cable splices within a splice closure assembly having end walls, supporting bars joining the end walls and bridging between the end walls, a splice closure space between the end walls, optical cables entering the end walls, corresponding optical conductors of the optical cables projecting from the optical cables and into the splice closure space, optical connector bodies terminated to corresponding conductors, and optical splices formed by pairs of the optical connector bodies in axial alignment within corresponding sleeve housings the improvement comprising; a receptacle for corresponding optical conductors, the receptacle comprising, side walls, a first splice mounting means on the receptacle for mounting a corresponding optical splice, a first compartment between the side walls of the receptacle for containing lengths of the optical conductors extending to a first optical splice mounted on the splice mounting means, a second splice mounting means on the receptacle for mounting a corresponding optical splice, a second compartment between the sidewalls of the receptacle for connecting lengths of optical conductors extending to a second optical splice mounted on the second splice mounting means, receptacle mounting means for mounting the receptacle to the supporting bars, with the side walls of the receptacle extending substantially parallel to the end walls of the splice closure assembly, and a holder of channel shape and having an open side and a closed side and opposed pairs of gripping fingers extending from the closed side for gripping and retaining a corresponding pair of optical connector bodies and a sleeve housing.

2. A splice organizer for optical cable splices within a splice closure assembly, as recited in claim 1 wherein each compartment receives a corresponding splice mounting means at an entrance to the corresponding compartment, and each entrance receives lengths of optical conductors extending from the corresponding optical splice mounted on the splice mounting means.

3. In a splice organizer for optical cable splices within a splice closure assembly having end walls, supporting bars joining the end walls and bridging between the end walls, a splice closure space between the end walls, optical cables entering the end walls, corresponding optical conductors of the optical cables projecting from the optical cables and into the splice closure space, optical connector bodies terminated to corresponding conductors, and optical splices formed by pairs of the optical connector bodies in axial alignment within corresponding sleeve housings the improvement comprising; a receptacle for corresponding optical conductors, the receptacle comprising, side walls, a first splice mounting means on the receptacle for mounting a corresponding optical splice, a first compartment between the side walls of the receptacle for containing lengths of the optical conductors extending to a first optical splice mounted on the splice mounting means, a second splice mounting means on the receptacle for mounting a corresponding optical splice, a second compartment between the sidewalls of the receptacle for connecting lengths of optical conductors extending to a second optical splice mounted on the second splice mounting means, and receptacle mounting means for mounting the receptacle to the supporting bars, with the side walls of the receptacle extending substantially parallel to the end walls of the splice closure assembly, the receptacle mounting means includes, a mounting bracket having a jaw for gripping a corresponding supporting bar, a web of the mounting bracket projecting toward the periphery of a corresponding receptacle, and adjusting means on the mounting bracket for adjusting the web position progressively toward the periphery of the corresponding receptacle.

4. A splice organizer for optical cable splices within a splice closure assembly, as recited in claim 3 wherein each compartment receives a corresponding splice mounting means at an entrance to the corresponding compartment, and each entrance receives lengths of optical conductors extending from the corresponding optical splice mounted on the splice mounting means.

5. In a splice organizer for optical conductors projecting from corresponding optical cables, for optical connector bodies connected to respective ends of the optical conductors, and for optical splices formed by the connector bodies being in opposed pairs to align respective ends of the optical conductors, the improvement comprising;
   a receptacle having first and second outer side walls,
   respective first and second openings bounded by and between said side walls for receiving the optical conductors projecting from corresponding optical cables,
   first and second splice mounting means in said first and said second openings for mounting a corresponding optical splice,
   a first compartment directly against the first outer side wall for containing lengths of corresponding optical conductors extending from a first optical splice mounted on the first splice mounting means, a second compartment directly against the second outer side wall for containing lengths of corresponding optical conductors extending from a second optical splice mounted on the second splice mounting means, said first sidewall forming an outer boundary of the first compartment, said second sidewall forming an outer boundary of the second compartment, and separating means for separating the first and second compartments from each other.

6. A splice organizer as recited in claim 5 wherein the improvement further comprises, a boundary of each of said compartments is defined by a corresponding dividing wall between said side walls.

7. A splice organizer as recited in claim 5, wherein the improvement further comprises, a mounting bracket engaging the receptacle and having a jaw, a web of the mounting bracket, and adjusting means of the mounting bracket for adjusting the web position progressively against a periphery of the receptacle.

8. A splice organizer as recited in claim 5, wherein the improvement further comprises, holder means for mounting removeably to corresponding splice mounting means and having a corresponding channel shape with an open side and a closed side and opposed pairs of gripping fingers extending from the closed side for gripping and retaining a corresponding pair of connector bodies of a corresponding optical splice.

* * * * *